Nov. 29, 1960    E. A. DE LA ROSA    2,962,578
STUD WELDING GUN

Filed Aug. 15, 1958    2 Sheets-Sheet 1

INVENTOR.
EFRAIN A. DE LA ROSA,
BY
McMorrow, Berman & Davidson
ATTORNEYS.

Nov. 29, 1960    E. A. DE LA ROSA    2,962,578
STUD WELDING GUN
Filed Aug. 15, 1958    2 Sheets-Sheet 2
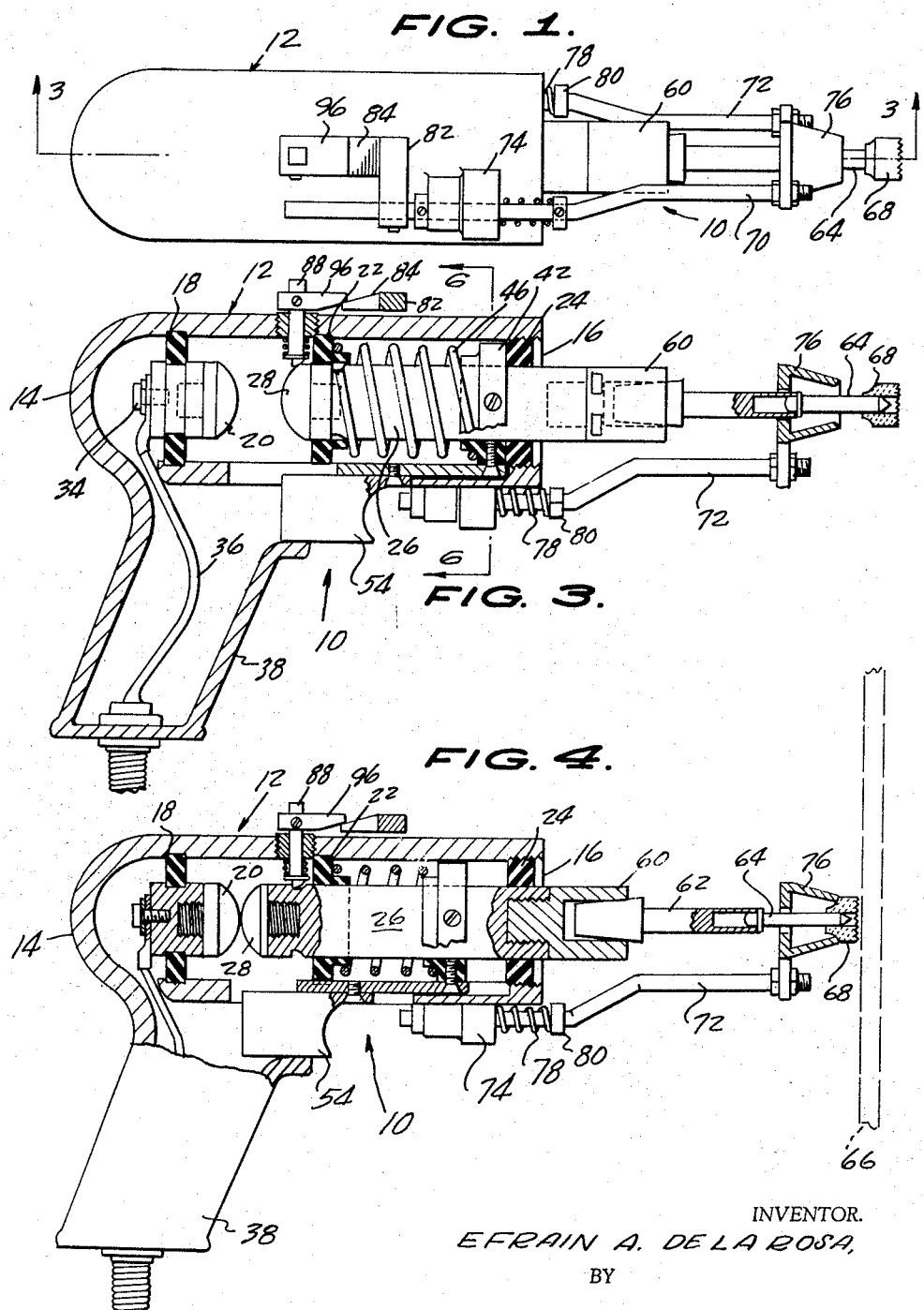
INVENTOR.
EFRAIN A. DE LA ROSA,
BY
McMorrow, Berman + Davidson
ATTORNEYS.

United States Patent Office 2,962,578
Patented Nov. 29, 1960

2,962,578
STUD WELDING GUN
Efrain A. de la Rosa, 744 E. 5th St., New York, N.Y.
Filed Aug. 15, 1958, Ser. No. 755,243
2 Claims. (Cl. 219—98)

The present invention relates to a gun for welding studs.

An object of the present invention is to provide a gun for welding studs which may be directly connected to a source of welding current without the employment of timing devices.

Another object of the present invention is to provide a gun for welding studs which is fabricated of a minimum number of components, one simple in structure, one sturdily constructed and of long-life characteristics, and one which is highly effective in action.

A further object of the present invention is to provide a gun for welding studs which is automatic in operation, one having means for employing studs of various sizes, and one which is economically feasible.

Figure 5:
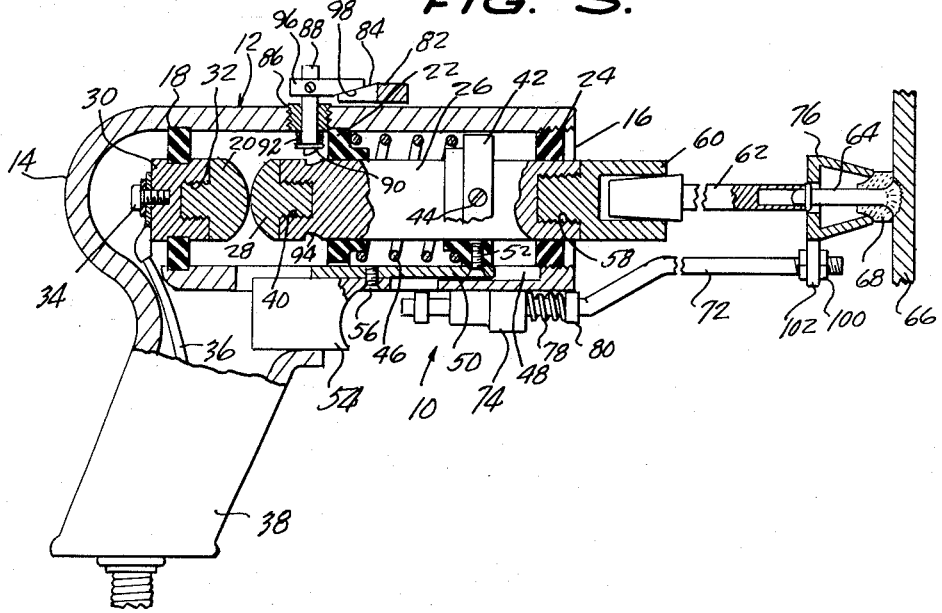
Figure 2:
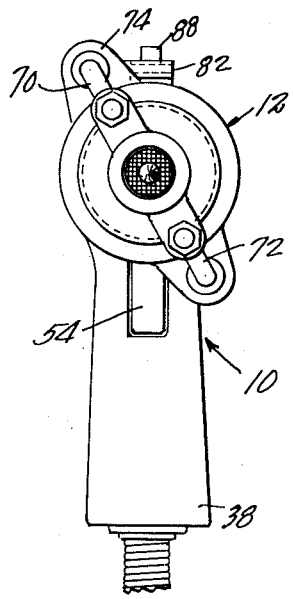
Figure 6:
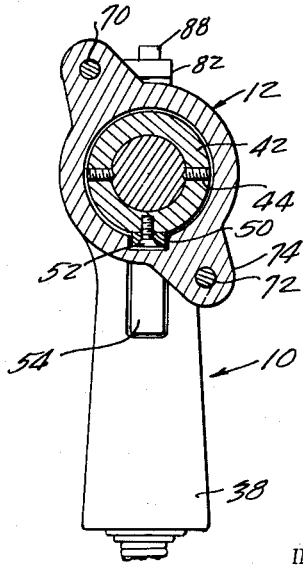

These and other objects and advantages of the present invention will be fully apparent from the following description when taken in conjunction with the annexed drawings, in which:

Figure 1 is a top plan view;
Figure 2 is an elevational view as seen from the front end;
Figure 3 is a view taken on the line 3—3 of Figure 1, showing the gun in a condition of rest;
Figure 4 is a view similar to Figure 3, showing the gun cocked and prepared for welding of a stud on a surface, the surface being shown in dotted lines;
Figure 5 is a view similar to Figure 3, showing the stud welded to the object surface, the trigger release pin being shown at the instant of release; and
Figure 6 is a view taken on the line 6—6 of Figure 3.

Referring in greater detail to the drawings, in which like numerals indicate like parts throughout the several views, the welding gun of the present invention is designated generally by the reference numeral 10 and comprises a barrel 12 having a closed end 14 and an open end 16. Within the barrel 12 adjacent and spaced from the closed end 14 is an annular insulating ring 18 carrying a fixed contact button 20. Other rings 22 and 24, also electrically non-conductive are arranged within the barrel 12 in spaced relation between the ring 18 and the open end 16 of the barrel 12. A plunger 26 extends through and is supported in the rings 22 and 24 for inward and outward movement relative to the contact button 20 and has one end within the barrel which is adjacent to and spaced from the contact button 20 and has the portion adjacent the other end contiguous to and exteriorly of the open end 16 of the barrel 12. The one end of the plunger 26 carries a second contact button 28 which is normally out of electrical engagement with the contact button 20 as shown in Figure 3, and which, when the plunger 26 is moved inwardly, is in electrical engagement with the contact button 20, as shown in Figure 4.

A holder 30 is provided on one end with a threaded bore 32 receiving the threaded portion of the button 20 for support of the latter. The other end of the holder 30 is provided with another threaded bore receiving a set screw 34 connecting the holder 30 to a wire 36 extending through the handle 38 of the gun 10 and leading to a source of welding current.

The end portion of the plunger 26 is similarly provided with a third bore 40 receiving the threaded portion of the second contact button 28.

A ring 42 is circumposed about the portion of the plunger 26 between the rings 22 and 24 and is fixedly secured thereto by means of cap screws 44. Both the ring 22 and the ring 42 have shoulders facing each other and forming seats for the end portions of a coil spring 46. The underside of the barrel 12 is provided with a slot 48 extending inwardly from the ring 24 and terminating at a point spaced from the ring 18. A plate member 50 is slidable in the slot 48 and is secured by means of a screw 52 to the ring 42. A trigger 54, slidable in the handle 38, is secured by a screw 56 to the plate member 50 at a point remote from the ring 42.

The end of the plunger 26 remote from the contact button 28 is provided with a threaded bore 58 receiving the threaded portion of a chuck 60. One end portion of a stud holder 62 is detachably received in a socket provided in the chuck 60 and the other end portion of the holder 62 is provided with a bore receiving a stud 64 which is to be welded to a plate member 66 or other surface.

The chuck 60, holder 62, and plunger 26, constitute means connected to a contact button 28 for attachment of the stud 64.

Support means is arranged outwardly of and spaced from the open end 16 of the barrel 12 for holding a ferrule 68 in encompassing relation with respect to the stud 64. Such support means is connected to the barrel 12 for reciprocatory movement toward and away from the open end 16 of the barrel 12. This means consists in a pair of rods 70 and 72 slidably mounted in ears 74 carried on the barrel 12 adjacent the open end 16. The rods 70 and 72 carry on their forward ends a forwardly tapering hollow sleeve 76, the nose portion of which receives the tapering end portion of the ferrule 68, as shown most clearly in Figure 5.

A coil spring 78 is circumposed about the portion of each of the rods 70 and 72 outwardly of the adjacent ear 74 and has one end bearing against the ear 74 and the other end bearing against a collar 80 fixedly secured to the adjacent rod. The spring 78 constitutes spring means operatively connected to the support means urging the reciprocatory movement of the support means in the direction away from the open end 16 of the barrel 12.

As shown in Figure 1, the rod 70 has a portion adjacent its rearward end projecting rearwardly out of the ear 74 and adjustably connected to an L-shaped arm 82 having an upwardly sloping cam face 84. The upper side of the barrel 12 is provided with a threaded bore receiving a plug 86 which supports for sliding vertical movement a latch element 88. The latch element 88 has a portion adjacent its lower end extending into the interior of the barrel 12 and carrying a collar 90 inwardly of its lower end. A coil spring 92 is circumposed about the latch element 88 between the collar 90 and the underface of the plug 86 and biases the latch element 88 to latching engagement of its lower end in a groove 94 extending about the plunger 26 at a point inwardly of and spaced from the contact button 28.

A horizontally disposed bar 96 having a cam face 98 on the lower side of its end portion is adjustably mounted upon the upper projecting end portion of the latch element 88. The latch element 88, together with the groove 94, constitutes interlocking means on the barrel 12 and on the plunger 26 for holding the contact button 28 in electrical contacting engagement with the contact button 20 after the plunger 26 has been moved rearwardly in the barrel 12 compressing the spring 46.

The spring 46 constitutes spring means operatively connected to the contact button 28 for effecting the outward movement of the contact button 28 upon release of the latch element 88.

The forward end portions of the rods 70 and 72 are threaded and lock nuts 100 on each side of the ears 102 which project from the perimeter of the sleeve 76 constitute a means by which the sleeve 76 may be adjustably positioned relative to the ends of the rods 70 and 72.

In operation, with the stud 64 inserted in the bore provided in the holder 62, and a ceramic ferrule such as designated by the reference numeral 68 is inserted upon the free end of the stud 64, as in Figure 3, the plunger 26 is moved inwardly by manual pressure applied to the trigger 54 which is operatively connected by the plate member 50 and ring 42 to the plunger 26. When the plunger 26 has been moved inwardly to the position in which the contact buttons 20 and 28 are in electrical engagement, the coil spring 92 forces the end of the latch element 88 into the groove 94 and effects the holding of the plunger 26 in the inward position.

Next, welding current of sufficient voltage and amperage is introduced into the wire 36 by conventional means and the plate 66 is connected to the opposite terminal of the welding current. Then the gun 10 is held so that the point of the stud 64 within the ferrule 68 is in proximity to the surface of the plate 66. Upon application of manually applied pressure, the stud 64 will approach the plate 66 until an arc is struck causing the adjacent portion of the stud 64 to become heated to a flowable state. Pressure of the ferrule 68 on the plate 66 effects the inward movement of the sleeve 76 and the attached rods 70 and 72 and the arm 82 is shifted rearwardly on the barrel 12 so that the cam face 84 engages the cam face 98 and lifts the latch element 88 against the compression of the coil spring 92 to effect the release of the plunger 26. The force of the spring 46 drives the stud forwardly through the ferrule 68 so that the molten part of the stud 64 is spread outwardly around the base of the ferrule 68 and into intimate welding engagement with the adjacent part of the plate 66, as in Figure 5, the plunger and one rod 72 being broken to show that the plunger 62 has moved forwardly an instant after the release of the latch element 88 to effect the spreading outwardly of the molten part of the stud 64.

What is claimed is:

1. A gun for welding studs comprising a barrel having an open end, a first contact fixedly positioned within said barrel inwardly of and remote from the open end, a plunger extending through the open end of said barrel and supported in spaced rings in said barrel for inward and outward movement relative to said first contact, said plunger having one end within said barrel and adjacent to and spaced from said contact and having the other end adjacent to and exteriorly of the open end of said barrel, a second contact on said one end of said plunger, hand actuable means exteriorly of said barrel and operatively connected to said plunger for effecting the inward movement of said plunger in contacting engagement of said second contact with said first contact, means on the other end of said plunger for attachment of a welding stud thereto, releasable interlocking means on said barrel and said plunger for holding said second contact in contacting engagement with said first contact, support means arranged outwardly of and spaced from said barrel open end and supported on said barrel for reciprocatory movement toward and away from said barrel open end for removably holding a ferrule in encompassing relation about the welding stud when the latter is attached to said second contact, and means connecting said support means to said interlocking means so that the reciprocatory movement of said support means in the direction toward said barrel open end effects the release of said interlocking means.

2. A gun for welding studs comprising a barrel having an open end, a first contact fixedly positioned within said barrel inwardly of and remote from the open end, a plunger extending through the open end of said barrel and supported in spaced rings in said barrel for inward and outward movement relative to said first contact, said plunger having one end within said barrel and adjacent to and spaced from said contact and having the other end adjacent to and exteriorly of the open end of said barrel, a second contact on said one end of said plunger, hand actuable means exteriorly of said barrel and operatively connected to said plunger for effecting the inward movement of said plunger in contacting engagement of said second contact with said first contact, means on the other end of said plunger for attachment of a welding stud thereto, releasable interlocking means on said barrel and said plunger for holding said second contact in contacting engagement with said first contact, support means arranged outwardly of and spaced from said barrel open end and supported on said barrel for reciprocatory movement toward and away from said barrel open end for removably holding a ferrule in encompassing relation about the welding stud when the latter is attached to said second contact, means connecting said support means to said interlocking means so that the reciprocatory movement of said support means in the direction toward said barrel open end effects the release of said interlocking means, and spring means operatively connected to said support means urging the reciprocatory movement of said support means in the direction away from said barrel open end.

References Cited in the file of this patent
UNITED STATES PATENTS

| | | |
|---|---|---|
| 2,110,832 | Hogg et al. | Mar. 8, 1938 |
| 2,260,969 | Grecca et al. | Oct. 28, 1941 |